United States Patent
Ricco

(10) Patent No.: US 6,578,560 B2
(45) Date of Patent: Jun. 17, 2003

(54) GAS INJECTION SYSTEM, PARTICULARLY OF METHANE, FOR INTERNAL COMBUSTION ENGINES, AND PRESSURE REGULATING VALVE COMPRISED IN SAID SYSTEM

(75) Inventor: Mario Ricco, Casamassima (IT)

(73) Assignee: CRF Societa Consortile per Azioni, Turin (IT)

( * ) Notice: Subject to any disclaimer, the term of this patent is extended or adjusted under 35 U.S.C. 154(b) by 0 days.

(21) Appl. No.: 09/991,963

(22) Filed: Nov. 26, 2001

(65) Prior Publication Data

US 2002/0062823 A1 May 30, 2002

(30) Foreign Application Priority Data

Nov. 24, 2000 (IT) ..................... T02000A1099

(51) Int. Cl.$^7$ .............................................. F02M 21/02
(52) U.S. Cl. ...................................................... 123/527
(58) Field of Search ................................. 123/527, 525, 123/575, 529

(56) References Cited

U.S. PATENT DOCUMENTS

| 4,606,322 A | * | 8/1986 | Reid et al. ................... 123/575 |
| 4,638,777 A | * | 1/1987 | Fanner et al. ................. 123/527 |
| 5,692,478 A | * | 12/1997 | Nogi et al. ................... 123/527 |
| 5,868,121 A | * | 2/1999 | Brown et al. ................. 123/527 |
| 5,899,194 A | * | 5/1999 | Iwatsuki et al. .............. 123/527 |
| 5,904,131 A | * | 5/1999 | O'Neill et al. ............... 123/527 |
| 6,041,765 A | * | 3/2000 | O'Neill et al. ............... 123/527 |
| 6,044,806 A | * | 4/2000 | Brown et al. ................. 123/529 |
| 6,101,986 A | * | 8/2000 | Brown et al. ................. 123/525 |
| 6,205,981 B1 | * | 3/2001 | Lorraine ...................... 123/514 |
| 6,371,092 B1 | * | 4/2002 | Guglielmo et al. .......... 123/527 |

\* cited by examiner

*Primary Examiner*—Tony M. Argenbright
*Assistant Examiner*—Jason Benton
(74) *Attorney, Agent, or Firm*—Sughrue Mion, PLLC

(57) ABSTRACT

Gas injection system, particularly of methane, for an internal combustion engine, comprising a plurality of electromagnetically controlled injectors associated to the various cylinders of the engine, a gas distributing manifold communicating with the injectors, a reservoir feeding the distributing manifold, where the pressurised gas is accumulated. A pressure regulating valve is interposed in the connection between the reservoir and is controlled by an electronic control unit so to vary the pressure of the gas in the distributing manifold according to the signals output by sensors of the pressure in the distributing manifold and in the line feeding the gas from the reservoir, also to obtain a pressure in the distributing manifold which is essentially equal to a prefixed theoretical value that the control unit detects according to one or more operative parameters of the engine on the basis of prefixed theoretical pressure values of the pressure stored in maps to be obtained in the distribution manifold as the conditions of operation of the engine vary.

12 Claims, 3 Drawing Sheets

Fig_2

GAS INJECTION SYSTEM, PARTICULARLY OF METHANE, FOR INTERNAL COMBUSTION ENGINES, AND PRESSURE REGULATING VALVE COMPRISED IN SAID SYSTEM

BACKGROUND OF THE INVENTION

The invention relates to gas injection systems, particularly of methane, for internal combustion engines, for the type comprising:

a plurality of electromagnetically controlled injectors associated to the various cylinders of the engine, a distributing manifold, or rail, communicating with said injectors, a reservoir feeding the distributing manifold, where the pressurised gas is accumulated, a pressure regulating valve interposed in the connection between the reservoir and said distributing manifold, and an electronic control unit set up to control the injectors and to control the opening time to meter the amount of gas injected in each cylinder according to the operating conditions of the engine.

Methane injection systems of the type indicated above have been recently proposed to replace more traditional systems which employ distributing devices to meter the methane to be mixed with the air feeding the engine, according to an arrangement which is similar to that of a normal gasoline carburettor. These more traditional solutions are not acceptable because they are not suitable for working in conjunction with an engine electronic control system which particularly is capable of controlling metering according to the composition of the exhaust gas detected by a lambda sensor. For this reason, the applicant has previously proposed (see European Patent EP 0 801 223) a methane injection system for internal combustion engines comprising a plurality of electromagnetically controlled injectors which are activated by an electronic control unit in order to meter the amount of gas injected in each cylinder according to the operative conditions of the engine.

In the methane electronic injection systems proposed to date, methane metering in the engine cylinders is obtained by varying the opening time of the injectors according to the various operative parameters of the engine, such as the position of the accelerator pedal, the speed of revolution of the engine, the ambient temperature, the altitude (which effects the amount of air taken in by the engine), etc. The opening time of the injectors is the only parameter which can be used to control methane metering, because the pressure of the methane in the distributing manifold is essentially constant.

Furthermore, in said known systems, the pressure regulating valve interposed between the methane reservoir and the distributing manifold essentially consists of a self-standing component, comprising a restricted passage and a membrane mechanism which regulates said passage. However, the systems configured in such a fashion were not satisfying in transient ratios of engine operation. Specifically, the systems are not capable of holding pressure downstream to the valve at a predefined value, which is essentially constant in the case of dynamic variations in the flow of methane, such as, for example, in the case of abrupt engine acceleration. Moreover, the systems are capable of working at a single predefined pressure value to be created in the distributing manifold. In actual fact, the engine operation presents a very high load dynamics which originates methane load variations, also for ratios in the range of 1:30 or 1:40. The pressure regulating valve is usually designed on the basis of a compromise between the existing needs in extreme conditions of load of the engine. This is because a pressure regulating valve with an excessively small passage may be optimal when the engine is idling but will not provide an adequately fast response when the engine load increases rapidly, such as in the case of abrupt acceleration. Conversely, if the passage of the pressure regulating valve is relatively wide, the system will respond well to high engine loads but will not be capable of ensuring accurate metering at low loads.

SUMMARY OF THE INVENTION

The object of the invention is to obviate said shortcomings, making a system which is capable of ensuring accurate gas metering in all conditions of operation of the engine and particularly in the case of rapid variations of gas flow determined by abrupt variations of engine load.

In order to achieve this object, the system according to the invention is characterised with respect to the known systems principally in that in comprises means for regulating the pressure of the gas in the distributing manifold.

More precisely, said regulation means comprise:

an electromagnetic actuator controlling said pressure regulating valve, a sensor of the pressure in the distributing manifold, suitable for sending an electrical signal indicative of said pressure to the electronic control unit, a sensor of the pressure in the gas feeding line between the reservoir and the pressure regulating valve, suitable for sending a electrical signal indicative of said pressure to the electronic control unit, memory means associated to said electronic control unit containing maps of the theoretical predetermined pressure values to be created in the distributing manifold according to the variation of the parameters of operation of the engine, said electronic control unit being programmed to control the electromagnetic actuator of the pressure regulating valve according to the signals output by the sensors of the pressure in the distributing manifold and of the pressure in the line upstream to the pressure regulating valve, in order to obtain a pressure in the distributing manifold which is essentially equal to the theoretical predetermined value that the control unit retrieves in said memory means according to the value of one or more parameters of operation of the engine.

Thanks to the aforesaid characteristics, the system according to this invention is consequently capable of ensuring accurate metering of gas in the cylinders of the engine in any condition of operation of the engine. From a practical point of view, the variation of pressure in the distributing manifold can reach, for example, ratios in the order of 1:3 or higher, for example with a minimum pressure value essentially equal to 3 bars and a maximum value equal to approximately 9 bars. Thanks to the possibility of regulating the pressure value in the distributing manifold, the system is capable of optimally managing any static or dynamic condition of operation of the engine.

Said pressure regulating valve according to the invention has a valve seat and a lock pin moveable between a closed position, in which the lock pin is in contact with the valve seat, and an open condition, in which a restriction is formed between the lock pin and the valve seat putting an inlet opening communicating with the line from the reservoir into communication with an outlet opening communicating with the line leading from the distributing manifold. An important characteristic of the invention is in that said control unit is set up to control a periodical switching of the pressure regulating valve between said closed and open conditions, at a predefined frequency. In other words, alternatively to progressively and continuously varying the passage of the pressure regulating valve according to the electrical control signal sent hereto, the regulation of the pressure in the distributing manifold can also be obtained by opening and closing the valve at a constant frequency. In this case, the regulation of the valve is obtained by varying the duty cycle of the valve, i.e. by varying the ratio between opening time and total period in each opening and closing cycle of the valve according to the pressure upstream and downstream to the valve and according to the conditions of operation of the engine, and particularly to the conditions of static and dynamic load of the engine.

According to an additional characteristic of the invention, said predefined frequency is chosen essentially equal to the frequency at which any injector in the system is activated. The opening of the pressure regulating valve is synchronous and timed in advance with respect to the activation of the injectors, so that said valve opens before each activation of any injection in the system. In this way, the pressure regulating valve also acts as a pre-metering valve, thus performing an important pre-metering function of the fuel immediately before it is injected into the cylinders of the engine via the respective injector.

Thanks to the method described above for regulating the pressure, a valve with a relatively high cross-sectional passage can be used, ensuring in any case precision and promptness of operation in any condition of operation. Furthermore, the choppered control of the pressure regulating valve described above ensures a more robust system for controlling the pressure in the distributing manifold deriving from the capacity of pre-metering the fuel, as mentioned above, before it is injected into the cylinders of the engine.

Additionally, said electronic control unit can be set up to implement said choppered regulation, i.e. by varying the duty cycle of the valve only when the speed of revolution of the engine is under a predetermined value, while for higher engine speeds the control unit is set up to cause a progressive opening of the valve according to the conditions of operation of the engine. An additional advantage of the system according to the invention is that the system is capable of ensuring full operativeness at very low values of the pressure in the methane reservoir 5, i.e. also when the reservoir is nearly entirely empty, this obviously increases the range of the motor vehicle. In this case, the driver may be alerted since when the reservoir is nearly empty the engine performance that can be ensured will obviously be reduced.

Regardless of the injection system described above, the invention also relates to a pressure regulating valve per se, usable in gas injection system of the type comprising a plurality of electromagnetically controlled injectors associated to the various cylinders in the engine, a distributing manifold of the gas to the injectors and a feeding reservoir of the gas to the distributing manifold, where the pressurised gas is accumulated. Said pressure regulating valve comprises, according per se to prior art, a valve body, defining a valve seat, a lock pin moveable between a closed position, in which the lock pin is in contact with the valve seat, and an open condition, in which a restriction is formed between the lock pin and the valve seat putting an inlet opening of the valve seat intended to communicate with a line from the reservoir into communication with an outlet opening communicating with a line leading from the distributing manifold of gas to the injectors, first elastic means for pushing the lock pin towards its closed position and solenoid means for moving the lock pin towards its open position whereby contrasting the action of said first elastic means.

The invention relates to a valve of the type described above, characterised in that said lock pin comprises a stem slidingly mounted in a cylindrical cavity of the valve body and a reduced diameter portion which defines an annular chamber inside said cavity communicating with said inlet opening, so that the pressure in the line communicating with said inlet opening acts on both end surfaces of said annular chamber and consequently does not cause a substantial movement of the lock pin. Always according to the invention, the valve comprises second elastic means tending to move the lock pin towards its open position, said second elastic means having a load lower than that of said first elastic means. The lock pin according to the invention is consequently of the balanced type. An additional characteristic of this invention is in that said stem has a first end facing said solenoid means and a second end defining an auxiliary chamber inside said cylindrical cavity, said auxiliary chamber being in communication with said outlet opening through the passage in the lock pin body. Thanks to this characteristic, the gas which may leak through the clearance between the stem of the lock pin and the aforesaid auxiliary cavity does not exert a force on the lock pin, because discharged in the outlet opening of the valve through said passage in the lock pin body. In a preferred embodiment, the aforesaid lock pin presents an active conical portion co-operating with a valve seat defined by the circular edge of an end opening of said cylindrical cavity. Said solenoid means comprise an electrical winding connected to the valve body and a ferromagnetic material core slidingly mounted in the valve body, with a first end pushed by said first elastic means and a second end which is held in contact with said lock pin in all phases of operation of the valve, by effect of the first and second elastic means.

The pressure regulating valve according to the invention is thus capable of ensuring optimal operation of the system in any condition of operation of the engine. The pressure regulating valve is capable of ensuring gas pressure in the reservoir in the order of 200 bars, gas flows in the order of 40 kg/h with moderate losses of load, not exceeding 10 bars, and is particularly capable of fast response with switching time between the open conditions and the closed condition in the order of hundreds of microseconds (for example, 500 microseconds). This advantage is obtained because, for the aforesaid reasons, the pressure communicated through the inlet opening of the valve does not exert a force on the lock pin, therefore said first elastic means which maintain the lock pin in the normally closed condition can be relatively weak and control the rapid opening and closing of the lock pin with a relatively small, low-power solenoid, which is consequently not very inductive and fast.

BRIEF DESCRIPTION OF THE DRAWINGS

Additional characteristics and advantages of the invention will now be described, by the way of example only, with reference to the accompanying drawings wherein.

DETAILED DESCRIPTION OF THE INVENTION

Figure 1:
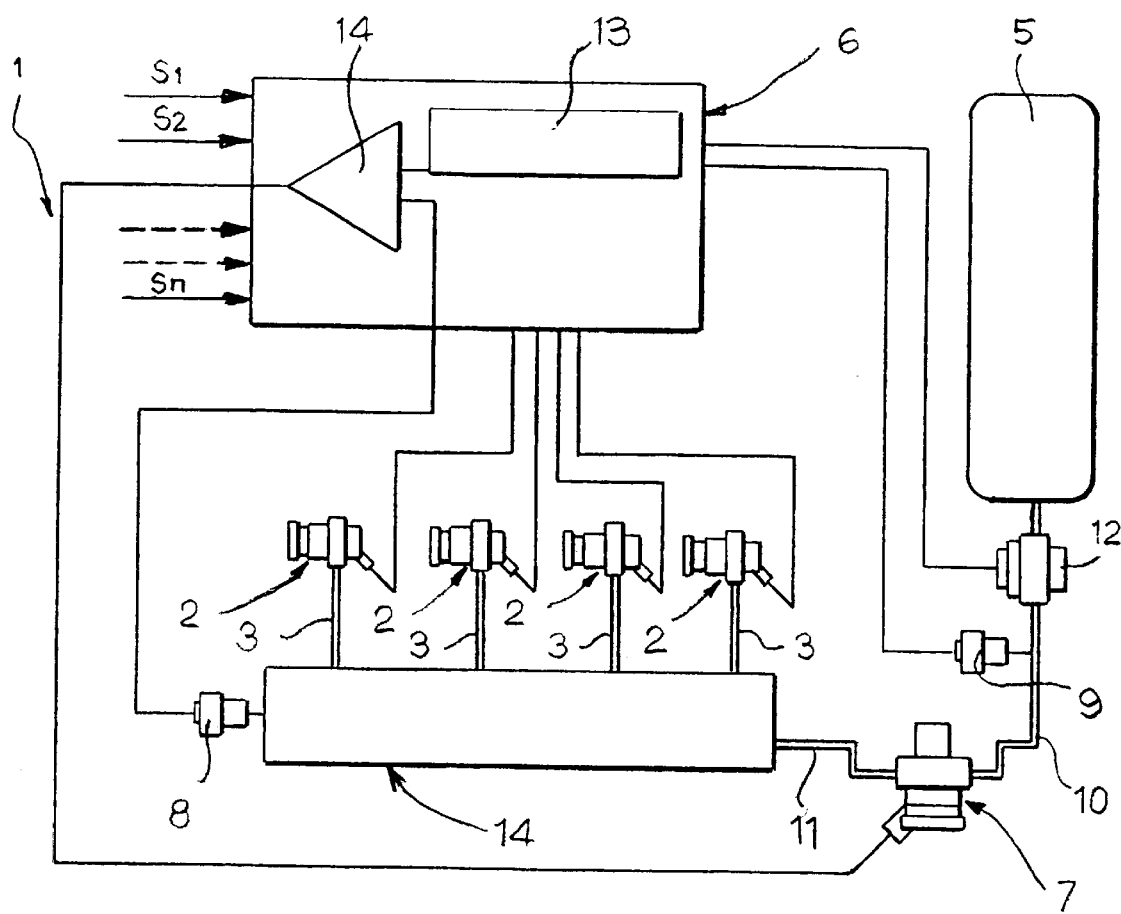
FIG. 1 is a schematic view of a methane electronic injection system for an internal combustion engine according to the invention.

With reference to FIG. 1, numeral 1 generically indicates a methane electronic injection system for an internal combustion engine. The system comprises a plurality of electromagnetically controlled injectors (or injection valves) 2 associated to the various cylinders in the engine. The assembly details of the injectors 2 are neither described nor illustrated herein, because the injectors can be made in any way according to prior art and because the details are not included in the object of the invention. The injectors 2 receive the methane via the respective lines 3 from a distributing manifold, or rail, 4. The distributing manifold 4 receives in turn the methane from a reservoir 5 where the high pressure methane is accumulated (e.g. at a pressure in the order of 200 bars). The control solenoids of the injectors 2 are controlled by an electronic control unit 6 on the basis of the signals $S_1, S_2, \ldots, S_n$, indicative of the various parameters of operation of the engine, including the position of the accelerator pedal, the speed of revolution of the engine, the ambient temperature, the altitude, etc. A pressure regulating valve 7, which is also controlled by the control unit 6, is interposed in the connection between the reservoir 5 and the distributing manifold 7. The control unit 6 also receives the signals output by the pressure sensors 8, 9 indicative of the pressure existing in the distributing manifold 4 and in the line 10 connecting the reservoir 5 to the pressure regulating valve 7, respectively. The latter reduces the pressure of the gas to the existing value in the reservoir 5 to the value existing in the manifold 4, which is connected to the valve 7 via the line 11. Furthermore, the system comprises a safety valve 12, also controlled by the control unit, for fully cutting off the outlet of the reservoir 5.

Figure 4:
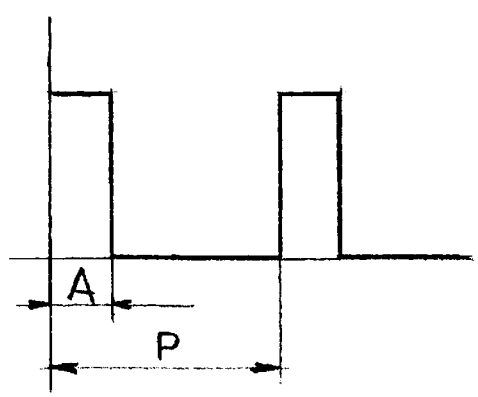

As illustrated above, memory means 13 are associated to the electronic control unit 6 containing theoretical predetermined values of the pressure to be obtained in the distributing manifold 4 as the parameter of operation of the engine change. During the operation of the engine, the pressure regulating valve 7, which is electromagnetically controlled, is controlled by the output of an error amplifier 14 on the basis of the comparison between the pressure signal detected by the sensor 8 in the distributing manifold 4 and the theoretical value of the pressure in the manifold 4 which is retrieved from the memory means 13 on the basis of the conditions of operation of the engine and the pressures detected by the sensors 8 and 9. As comprehensively described above, the control of the pressure regulating valve 7 is of the choppered type. In other words, the valve 7 is continuously switched between the all open condition according to a cycle of the type illustrated in FIG. 4, where P indicates the total period of each opening and closing cycle of the valve and A is the opening time of the valve in each cycle. The regulation is obtained by varying the duty cycle, i.e. the cycle of operation of the valve, i.e. the A/P ratio between the opening time of the valve in each cycle and the total time of the cycle. In this way, a variation of the pressure in the distributing manifold 4 can be obtained also in the order of 1:3 or 1:4, e.g. with a minimum of 3 bars and a maximum of 9 bars, which permits an optimal management of the system in any static or dynamic condition of operation of the engine, while ensuring a high level of robustness of the system itself. Particularly, accurate operation of the methane injection system can be ensured also in the case of high, abrupt variations of gas flow, according to ratios in the order of 1:30 or 1:40.

As also indicated in the preamble of the description, the switching between the open status and the closed status of the pressure regulating valve 7 is made at a fixed, predetermined frequency, preferably equal to the frequency at which any injector is activated during operation of the engine. The opening of the pressure regulating valve 7 is synchronous and timed in advance with respect to the activation of the injectors 2, therefore the valve 7 opens whenever an injector 2 is activated, shortly before the opening of the injector. In this way, the valve 7 also pre-meters the fuel which is injected in the cylinders of the engine via the respective injector.

Figure 2:
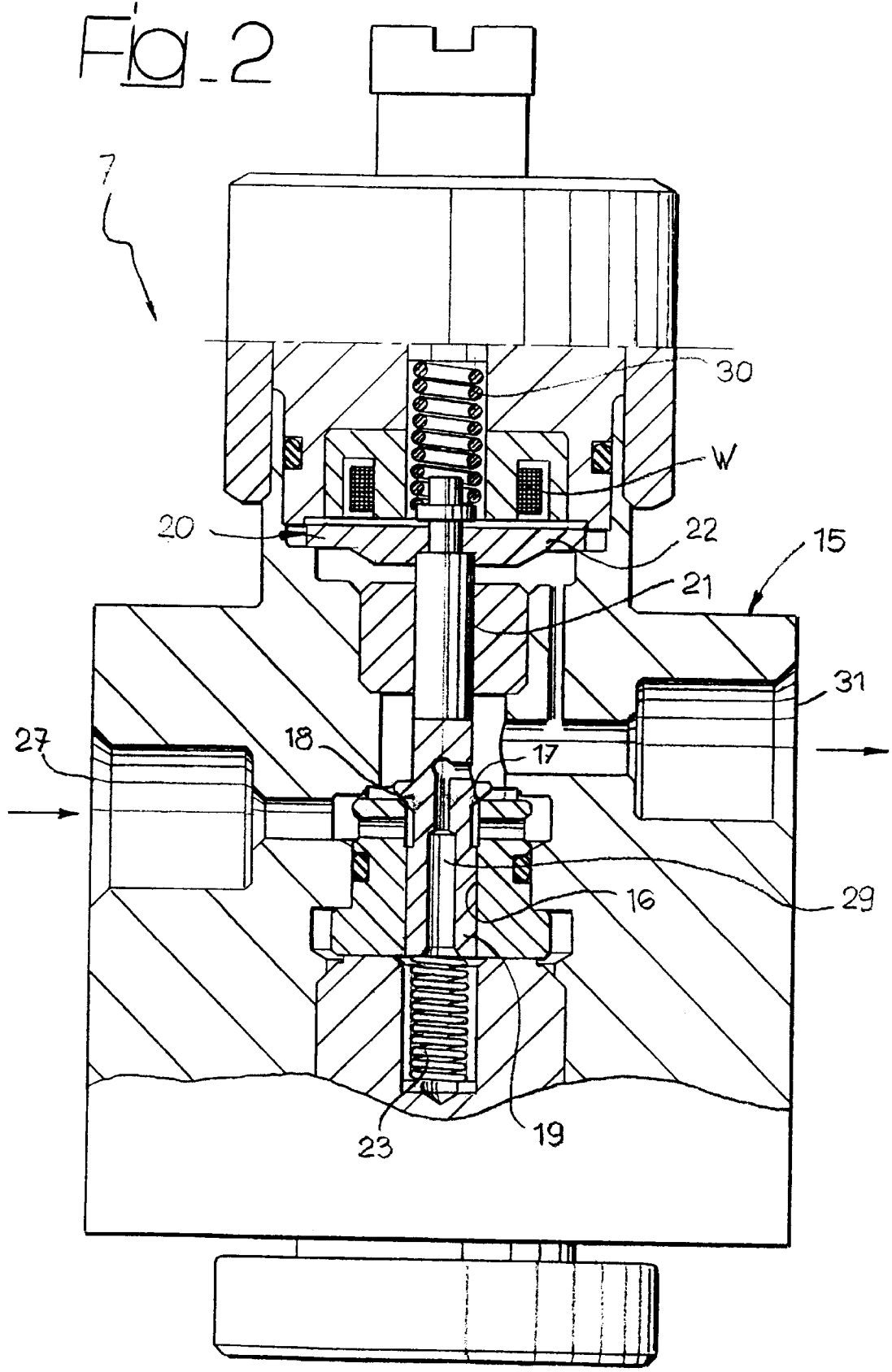
FIG. 2 is a cross-sectional view of an example of embodiment of the pressure regulating valve according to the invention.

Said choppered regulation of the valve can also be made only under a predetermined speed of revolution of the engine, while over this value the electronic control unit continuously and progressively opens the valve according to the conditions of operation of the engine. FIG. 2 illustrates a preferred embodiment of implementation of the valve according to the invention. The valve, generically indicated with numeral 7, comprises a valve body 15 in which a cylindrical cavity 16 is defined. The cavity 16 has an end opening 17 whose annular edge defines a valve seat for a lock pin 18 with an active part shaped as a frustum of a cone and a cylindrical stem 19 slidingly mounted in the cylindrical cavity 16. The lock pin 18 is held in the closed condition, in contact with the valve seat 17, by a spring 30 mounted in the body 15 of the valve which presses against the lock pin 18 by interposition of a ferromagnetic core 20 associated to a solenoid W which is also mounted in the body of the valve 15. The core 20 comprises a cylindrical stem 21 joined to an end of a plate 22 facing one end of the solenoid W. The opposite end of the stem 21 of the core 20 rests on an end of the lock pin 18. The opposite end of the lock pin 18 is pushed by a spring 23 whose load is lower than that of the spring 30.

Figure 3:
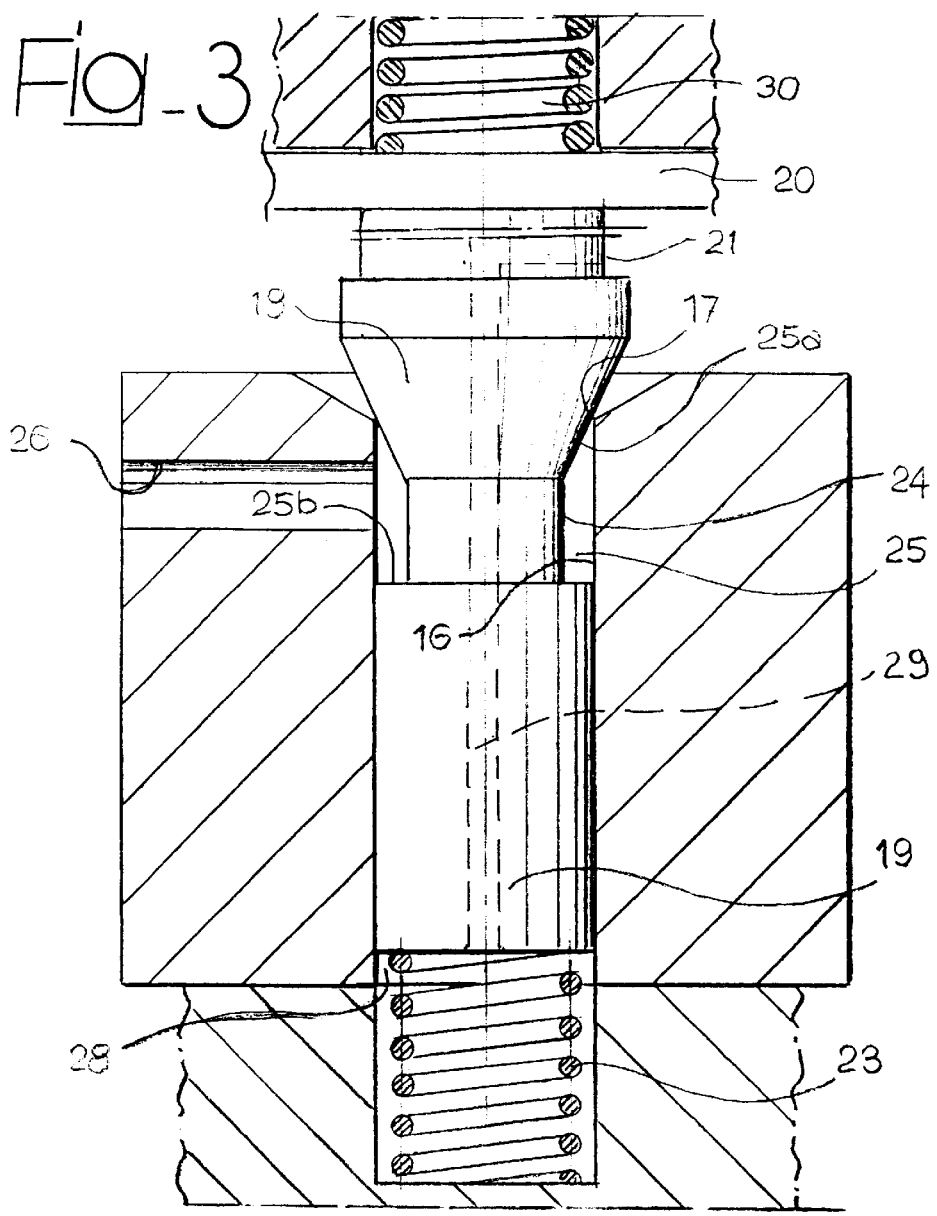
FIG. 3 is a schematic view on a larger scale of a part in FIGS. 2 and 4 illustrating the operating cycle of the valve in FIG. 2.

As clearly appears in FIG. 3, the stem 19 presents a reduced diameter part 24, which defines an annular chamber 25 communicating via the passage 26 with an inlet opening 27 of the valve intended to be connected to the line 10 from the pressurised gas reservoir 5. By effect of this arrangement, the pressure of the gas in the reservoir, communicated to the chamber 25, is sent to both end surfaces 25a, 25b of the chamber 25 and therefore does not cause any substantial movement of the lock pin 18. Consequently, the load of the spring 30 required to ensure the closed condition of the lock pin when the system is not active is relatively low. The spring 23 is required to ensure that the lock pin 18 is always kept in contact with the ferromagnetic core 20 of the solenoid. Consequently, it is sufficient for the spring 30 to have a load slightly higher than that of the spring 23 to ensure the closure of the lock pin 18 in the inoperative condition of the system. For the same reason, the solenoid W is capable of ensuring a very rapid opening of the lock pin without requiring a high supply power because it simply needs to overcome the different of loads between the spring 30 and the spring 23.

Since the clearance existing between the stem 19 and the cylindrical cavity 16 can determine a leakage of methane into the chamber 25 of the chamber 28 located under the stem 19 (with reference to FIG. 3), the body of the lock pin presents an internal passage 29 which puts the chamber 28 directly into communication with the outlet opening 31, connected to the line 11 which leads to the distributing manifold 4. In the way, the pressure in the chamber 28 is equal to that at valve output and does not consequently determine the application of any force of the lock pin.

In operation, as previously indicated, the electronic control unit intermittently activates the solenoid so to continuously switch the lock pin between its closed position and its open position, the regulation being obtained by intervening on the duty cycle, i.e. on the operating cycle of the valve, i.e. of the A/P ratio defined above, with the advantages indicated above.

An additional important advantage of the system according to the invention is that the system is capable of ensuring full operativeness also at very low pressure values in the methane reservoir 5, i.e. also when the reservoir is nearly entirely empty, which obviously increases the range of the motor vehicle. Moreover, numerous changes can be implemented to the construction and embodiments of the invention herein envisaged without departing from the scope of the present invention, as defined by the following claims.

What is claimed is:

1. Gas injection system, particularly of methane, for an internal combustion engine, comprising:
    a plurality of electromagnetically controlled injectors associated to the various cylinders of the engine,
    a distributing manifold, or rail, communicating with said injectors,
    a reservoir feeding the distributing manifold, wherein the pressurized gas is accumulated,
    pressure regulating valve interposed in the connection between the reservoir and siad distributing manifold, and
    an electronic control unit set up to control the injectors and to control the opening time to meter the amount of gas injected in each cylinder according to the operating conditions of the engine,
    wherein said system also comprises means for regulating the pressure of the gas in the distributing manifold,
    wherein said regulation means are set up to regulate the pressure in the distributing manifold according to the conditions of operation of the engine, and
    wherein said regulation means comprise:
        an electromagnetic actuator controlling said pressure regulating valve,
        a sensor of the pressure in the distributing manifold, suitable for sending an electrical signal indicative of said pressure to the electronic control unit,
        a sensor of the pressure in the gas feeding line between the reservoir and the pressure regulating valve, suitable for sending an electrical signal indicative of said pressure to the electronic control unit,
        memory means associated to said electronic control unit containing maps of the theoretical predetermined pressure values to be created in the distributing manifold according to the variation of the parameters of operation of the engine,
        said electronic control unit being programmed to control the electromagnetic actuator of the pressure regulating valve according to the signals output by the sensors of the pressure in the distributing manifold and of the pressure in the line upstream to the pressure regulating valve, in order to obtain a pressure in the distributing manifold which is essentially equal to the theoretical predetermined value that the control unit retrieves in said memory means according to the value of one or more parameters of operation of the engine.

2. Gas injection system according to claim 1, wherein said parameters of operation of the engine comprise at least the position of the accelerator pedal and the speed of revolution of the engine.

3. Gas injection system according to claim 1, wherein pressure regulating valve has a valve seat and a lock pin moveable between a closed position, in which the lock pin is in contact with the valve seat, and an open condition, in which a restriction is formed between the lock pin and the valve seat putting an inlet opening communicating with the line from the reservoir into communication with an outlet opening communicating with the line leading from the distributing manifold,
and in that, said control unit is set up to control a periodical switching of the pressure regulating valve of the pressure regulating valve between said closed and open conditions, at a predefined frequency.

4. Gas injection system according to claim 3, wherein said predetermined frequency is chosen to be essentially equal to the frequency with which any injector in the system is activated.

5. Gas injection system according to claim 4, wherein the opening of the pressure regulating valve is synchronous and timed in advance with respect to the activation of injectors, so that said valve opens whenever an injector in the system is activated, shortly before the activation of the injector.

6. Gas injection system according to claim 5, wherein said electronic control unit is set up to obtain the regulation of the pressure in the distributing manifold by means of varying the duty cycle of the valve, i.e. by varying the ratio between opening time (A) and total period (P) of each opening and closing cycle of the valve according to the pressure upstream and downstream to the valve and to the conditions of operation of the engine, and particularly to the static and dynamic load conditions of the engine.

7. Gas injection system according to claim 1, wherein said electronic control unit is set up to implement each regulation by varying the duty cycle of the valve only when the speed of revolution of the engine is under a predefined value, while for higher speeds the control unit is set to cause a progressive, continuous opening of the valve according to the conditions of operation of the engine.

8. Pressure regulating valve usable in a gas injection system comprising a plurality of electromagnetically controlled injectors associated to the various cylinders in the engine, a distributing manifold of the gas to the injectors and a feeding reservoir of the gas to the distributing manifold, where the pressurised gas is accumulated, in which said valve comprises:
    a valve body, defining a valve seat,
    a lock pin moveable between a closed position, in which the lock pin is in contact with the valve seat, and an open condition, in which a restriction is formed between the lock pin and the valve seat putting an inlet opening of the valve seat intended to communicate with a line from the reservoir into communication with an outlet opening communicating with a line leading from the distributing manifold of gas to the injectors,
    first elastic means for pushing the lock pin towards its closed position, and
    solenoid means for moving the lock pin towards its open position whereby contrasting the action of said first elastic means,
characterised in that:
    said lock pin comprises a stem slidingly mounted in a cylindrical cavity of the valve body and a reduced diameter portion which defines an annular chamber inside said cavity communicating with said inlet opening, so that the pressure in the line communicating with said inlet opening acts on both end surfaces of said annular chamber and consequently does not cause a substantial movement of the lock pin.

9. Pressure regulating valve according to claim 8, wherein it comprises second elastic means tending to move the lock pin towards its open position, said second elastic means having a load lower than that of said first elastic means.

10. Pressure regulating valve according to claim 8, wherein said stem of the lock pin has a first end facing said solenoid means and a second end defining an auxiliary chamber inside said cylindrical cavity, said auxiliary chamber being in communication with said outlet opening through the passage in the lock pin body.

11. Pressure regulating valve according to claim 8, wherein said lock pin presents an active conical portion co-operating with a valve seat defined by the circular edge of an end opening of said cylindrical cavity.

12. Pressure regulating valve according to claim 9, wherein said solenoid means comprise an electrical winding connected to the valve body and a ferromagnetic material core slidingly mounted in the valve body, with a first end pushed by said first elastic means and a second end which is held in contact with said lock pin in all phases of operation of the valve, by effect of the first and second elastic means.

* * * * *